(12) United States Patent
Monzen et al.

(10) Patent No.: US 6,623,637 B1
(45) Date of Patent: Sep. 23, 2003

(54) HOLLOW-FIBER MEMBRANE MODULE

(75) Inventors: Takashi Monzen, Yamanashi (JP);
Takahito Hirashima, Yamanashi (JP)

(73) Assignee: KITZ Corporation, Chiba (JP)

( * ) Notice: Subject to any disclaimer, the term of this patent is extended or adjusted under 35 U.S.C. 154(b) by 0 days.

(21) Appl. No.: 09/331,770

(22) PCT Filed: Dec. 24, 1997

(86) PCT No.: PCT/JP97/04793

§ 371 (c)(1),
(2), (4) Date: Jun. 24, 1999

(87) PCT Pub. No.: WO98/28065

PCT Pub. Date: Jul. 2, 1998

(30) Foreign Application Priority Data

Dec. 24, 1996 (JP) ............................................. 8-359850

(51) Int. Cl.⁷ ........................... B01D 63/10; B01D 63/02
(52) U.S. Cl. .............................. 210/321.74; 210/321.6; 210/321.61; 210/321.83; 210/500.23; 210/500.36; 210/500.38; 210/500.39
(58) Field of Search ........................ 210/321.6, 321.61, 210/321.74, 321.83, 500.23, 500.36, 500.38, 500.39

(56) References Cited

U.S. PATENT DOCUMENTS 4,880,440 A * 11/1989 Perrin ................... 210/500.23
5,263,982 A * 11/1993 Shimomura et al. ....... 604/4.01
6,008,040 A * 12/1999 Datar ......................... 210/255

FOREIGN PATENT DOCUMENTS

| JP | 49-94580 A | * | 9/1974 |
| JP | 62-11508 A | * | 1/1987 |
| JP | 64-34405 A | * | 2/1989 |
| JP | 2-111423 A | * | 4/1990 |
| JP | 4-27421 A | * | 1/1992 |
| JP | 4-109956 A | * | 4/1992 |

* cited by examiner

Primary Examiner—John Kim
(74) Attorney, Agent, or Firm—Wenderoth, Lind & Ponack, L.L.P.

(57) ABSTRACT

This invention relates to a hollow fiber membrane module to be used in industrial fields such as the semiconductor industry, food processing industry, pharmaceutical industry, and medical industry, and to a method for the production thereof. Permselective hollow fiber membranes having rigidity are cheese-wound in a plurality of layers, thereby forming a hollow fiber membrane bundle. One terminal part of this hollow fiber membrane bundle together with a case is adhered and solidified with a thermally molten mass of thermoplastic resin, thereby forming a solidified part. This solidified part is cut to form a sealed part serving to open terminal parts of the hollow fiber membranes.

10 Claims, 13 Drawing Sheets

Characteristic of initial flow volume in product of this invention and conventional product

FIG. 12

Test of capacity for filtration of suspended matter

HOLLOW-FIBER MEMBRANE MODULE

BACKGROUND OF THE INVENTION

This invention relates to a hollow fiber membrane module to be used in industrial fields such as the semiconductor industry, food processing industry, pharmaceutical industry, and medical industry and to a method for the production thereof. More particularly, this invention relates to a hollow fiber membrane module which is suitable for a use requiring a smaller decline in flow volume of a fluid between the initial stage and the latter stage of filtration.

Generally, a hollow fiber membrane module is formed by causing a hollow fiber membrane wound on a bobbin to be rewound on a rewinding jig having a polygonal cross section. One side of a coil formed of a multiplicity of hollow fiber membranes rewound on the jig is then cut, thereby giving rise to a membrane bundle. The openings in the opposite terminal parts of the membrane bundle are stoppered in a straight form or in a looped form lest the interiors of the membranes of the bundle be invaded by a potting resin. Thereafter, the stoppered portions are potted, thereby completing sealed parts (as disclosed in JP-B-07-106,302, for example).

As another hollow fiber membrane module, the construction of a membrane bundle obtained by using hollow fiber membranes as wefts, knitting the wefts across warps after the fashion of a textile to produce a sheet, and rolling the sheet of fabric around itself has been proposed. The construction of a membrane bundle obtained by rolling the aforementioned sheet of fabric around itself with a mesh interposed between the superposed plies of the roll has also been known (as disclosed in JP-A-62-57, 965, for example).

These hollow fiber yarn bundles open in at least one terminal part of membrane bundle, and a diaphragm adapted to prevent the fluids flowing inside and outside the hollow fiber membranes from mingling with each other is disposed in the opening. This diaphragm uses an adhesive agent of thermosetting resin such as epoxy, urethane, or silicone rubber. These thermosetting resins have low initial viscosity, are suitable for the purpose of immersion-solidifying or injection-solidifying a permselective membrane or a microporous membrane which has small rigidity, and are particularly optimum for a membranous material of the shape of a hollow fiber.

When such a thermosetting resin is utilized for the technique of potting hollow fiber membranes, a large number of hollow fiber membranes are uniformly dispersed at the potting position, and the thermosetting resin fills the gaps between the hollow fiber membranes. If the thermosetting resin increases in viscosity, it will no longer be able to fill the gaps between the hollow fiber membranes or produce a fully satisfactory sealed state.

As the potting resin for filling the gaps between the hollow fiber membranes, therefore, a thermosetting resin which has low viscosity is used in particular. Such is the true state of the prior art.

When the hollow fiber membrane bundle having the straight shape or looped shape mentioned above is subjected to vertical filtration, however, the efficiency of filtration gradually degrades by clogging. It is known that the degree of the consequent degradation of flow volume, when rated is based on a fixed membrane area, decreases in proportion as the number of membranes decreases and the length of membrane increases.

In this case, the increase in membrane length requires the length of the module to be increased and, as a result, entails a disadvantage of making incorporation of modules in a given device difficult. An attempt to have long hollow fibers accommodated in a short module case causes breakage of fibers and inevitably adds to the number of hours of work for accommodation. Since the conventional hollow fiber membranes individually allow a large degree of freedom and easily induce relevant fluids to drift, they make it difficult for materials in a fluid to transfer through the membrane, and prevent the membrane from effectively achieving filtration efficiency.

The specification of a plain coil of the sheet of textile mentioned above embraces a device for preventing the drift by the intervention of a mesh. However, since this device adds to the number of component members, results in increased costs, and enhances the chance of yielding an extracted matter from the materials themselves which are required by the module in the existing state, the number of component members of the module is preferred to be as small as permissible.

As the potting resin for the hollow fiber membrane, a thermosetting resin having low viscosity is used as mentioned above. In the semiconductor industry, the materials for semiconductors have been in need of chemical resistance, with the gradual rise in the degree of integration of semiconductors as a contributory factor. Thus, the module relevant herein ought to adopt, as the potting material, a thermoplastic resin which is identical or similar to the thermoplastic resin for a hollow fiber membrane. Incidentally, the thermoplastic resin generally has a high melting temperature and exhibits high viscosity at that temperature and burdens the potting technique with various problems yet to be solved.

A thermoplastic resin favors adoption of the immersion or injection potting because it has high viscosity and consequently makes adoption of the centrifugal potting difficult. In this case, since hollow fiber membranes themselves have a small amount of rigidity and inevitably yield to the pressure of insertion into the thermoplastic resin or the pressure of injection of the resin, they are partly distributed unevenly and are unevenly dispersed in the terminal parts of membranes. Since this unevenness prevents sufficient filling of the gaps between the hollow fiber membranes with the potting resin, the membranes allow communication between the primary side and the secondary side to the extent of inevitably impairing the filtering function thereof.

When the method of crushing (for example, by thermosetting resin, thermoplastic resin, thermal deposition, or shearing) is carried out for stoppering membranes in advance of the adoption of the immersion or injection potting technique, this method results in degrading the operational efficiency because the hollow fiber membranes which have undergone the stoppering treatment no longer allow effective potting unless they are separated one by one.

The problem further arises that the terminal parts of the hollow fiber membranes generate voids which are bubbles of vacuum, unless the thermoplastic resin is deprived of strain by shrinkage before it is allowed to set. The hollow fiber membranes generally are subjected to centrifugal cooling after they have undergone the potting treatment. This cooling, however, brings the problem of adding to the number of component steps of the process.

SUMMARY OF THE INVENTION

This invention has been perfected in view of a diligent study initiated as a result of the true state of prior art described above. It has for an object thereof the provision of a compact hollow fiber membrane module, which precludes the occurrence of defective potting by failing to completely fill the gaps between the hollow fiber membrane with a resin, obviates the necessity for a stoppering step, further obviates the necessity for a step of removing voids occurring during the course of solidification, avoids the possibility of inducing fluids inside and outside the hollow fiber membrane to drift, effects material transfer in fluids through a membrane with high efficiency, and allows accommodation of long hollow fiber membranes in a short module. It is particularly directed at providing a hollow fiber membrane module which is endowed with enhanced efficiency of filtration and consequently adapted for use in the field of semiconductor industry calling for resistance to chemicals, for example.

To accomplish the object mentioned above, this invention provides a hollow fiber membrane module which is obtained by cheese-winding a plurality of layers of permselective hollow fiber membranes made of thermoplastic resin, thereby forming a rigid membrane bundle. At least in one terminal part of the membrane bundle, a sealed part of thermoplastic resin serves to open the terminal faces of the hollow fiber membranes. The module can be applied to any one of a deaeration module, a membrane type drier, pervaporation (a method of vaporation by permeation) and a bioreactor.

Further, the present invention contemplates cheese-winding a plurality of layers of permselective hollow fiber membranes made of thermoplastic resin, thereby forming a rigid hollow fiber membrane bundle. In at least one terminal part of the hollow fiber membrane bundle, a sealed part of thermoplastic resin serves to open the terminal faces of the hollow fiber membranes together with a case in a sealed state, and the case encloses the outer periphery of the hollow fiber membrane bundle in a tight state. The resultant module is applied to any one of a deaeration module, a membrane type drier, pervaporation (a method of vaporation by permeation) and a bioreactor.

In this case, the adjoining hollow fiber membranes are superposed in a plurality of layers as cheese-wound in a self-supportably tight state, thereby forming a membrane bundle.

When a core tube is removed from the cheese-wound membrane bundle, a hollow part is formed in the portion formerly occupied by the core tube. The efficiency of filtration of the module is enhanced by inserting a spacer in that hollow part to preclude the occurrence of a dead space for the fluids being treated.

Further, the hollow fiber membranes are formed of a thermoplastic resin, and the sealed part is formed of a thermoplastic resin. Particularly, the thermoplastic resin is polyolefin such as polyethylene or polypropylene, fluorine resin, polyamide or polyimide, for example.

The hollow fiber membrane bundle is intended for allowing a fluid under treatment to be internally refluxed by producing a fluid motion inside the hollow fiber membranes or for allowing the fluid under treatment to be externally refluxed by producing a fluid motion outside the hollow fiber membranes.

The method of this invention for the production of a hollow fiber membrane module comprises cheese-winding a plurality of layers of hollow fiber membranes of thermoplastic resin permselective to a fluid on a core tube at a prescribed angle of winding, thereby forming a membrane bundle. At least one terminal part of the membrane bundle is adhered to a thermally molten mass of thermoplastic resin identical or similar to the thermoplastic resin of the hollow fiber membranes, thereby forming a solidified part. The solidified part is then cut to open the terminal parts of the hollow fiber membranes, thereby forming a sealed part.

In this case, the sealed part is obtained by providing a resin reservoir at a position underlying a resin layer placed in a die, and immersing in the resin layer one terminal part of the membrane bundle together with the case enclosing the outer periphery of the hollow fiber membrane bundle in a tight state, thereby causing adhesion and solidification of the one terminal part with the resin so as to form a solidified part. The solidified part is ten cut so as to open the terminal parts of the hollow fiber membranes. The ingot piping which is formed in the reservoir of resin is cut and removed by separating the portion of the solidified part which sets the resin reservoir.

In this case, the angle of cheese-winding, $\theta$, is in the range of $0°<\theta<90°$.

Since the hollow fiber membrane module contemplated by this invention is constructed as described above, the length of the hollow fiber membranes can be increased by properly selecting the angle of cheese-winding. Consequently, the combined capacity of the hollow fiber membranes per unit volume can be increased as compared with the conventional modules. Further, since the hollow fiber membrane module provided by this invention has long hollow fiber membranes accommodated in a short module, the invention permits production of a module so compact and so capable of effective filtration as to be infallibly mounted in a pipeline having a small interfacial dimension.

Further, the hollow fiber membrane module enjoys conspicuous improvement in yield because the membrane bundle continues to retain rigidity, attains immersion into or injection with the molten resin having great viscosity, and permits uniform dispersion of resin without yielding to the pressure of insertion into or the pressure of injection with the resin.

Further, the process for production according to the present invention obviates the necessity for stoppering hollow fiber membranes. This fact allows a decrease in the number of component steps of the process, improves the operational efficiency, and contributes to the reduction in cost. Moreover, the speed of potting can be increased because the potting step is allowed to utilize the resin reservoir, and the subsequent step is adapted to cut and separate the resin reservoir having the ingot piping when the solidified part is cut. This point also encourages an attempt to improve the yield and the operational efficiency of potting.

Since the hollow fiber membranes and the sealed part use the thermoplastic resin, the liquation of organic substances and metal ions can be alleviated, and the adverse effects of organic solvents and various chemicals can be coped with.

Further, the hollow fiber membrane module according to this invention has a conspicuous effect on the operation of filtration due to the material transfer implemented by the use of a deaeration module, a membrane type drier, pervaporation (a method of vaporation by permeation), and a bioreactor because it allows no easy occurrence of the phenomenon of channeling, offers stable performance, and brings no dispersion of quality in product. Furthermore, since a hollow fiber membrane module having long hollow fiber membranes can be provided even when mounted in a predetermined interfacial dimension, it enables the material transfer to proceed efficiently in the hollow fiber membranes, and notably improves the performance owing to an elongation of the duration of contact. It also contributes greatly to increase the power of filtration and has a fine effect in the semiconductor industry calling for resistance to chemicals, for example, because it can cope stably with the dynamical pressure of the fluid being filtered.

DETAILED DESCRIPTION OF THE INVENTION

The embodiments of the hollow fiber membrane module and the method for production thereof according to this invention will be described in detail below in accordance with FIG. 1 through FIG. 20.

Figure 1:
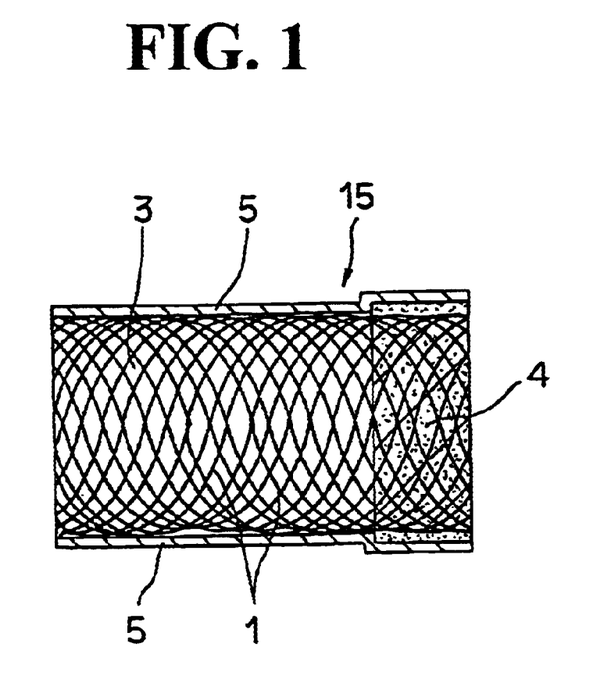
FIG. 1 is a front view of a hollow fiber membrane module according to this invention.
Figure 2:
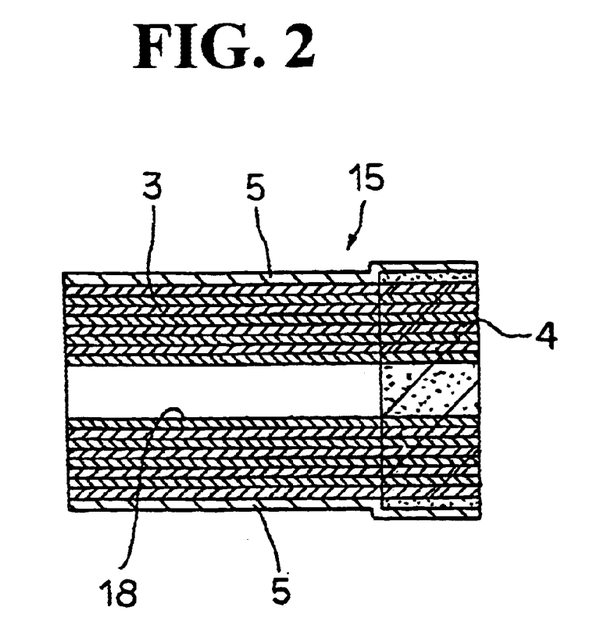
FIG. 2 is a sectional explanatory diagram of the hollow fiber module of FIG. 1.
Figure 3:
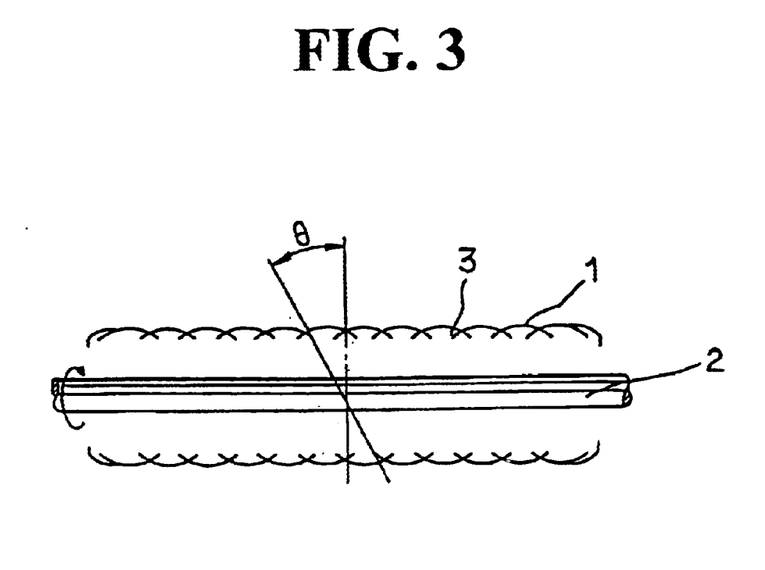
FIG. 3 is an explanatory diagram illustrating the state in which the hollow fiber membranes are wound on a core tube by a cheese-winding device.
Figure 16:
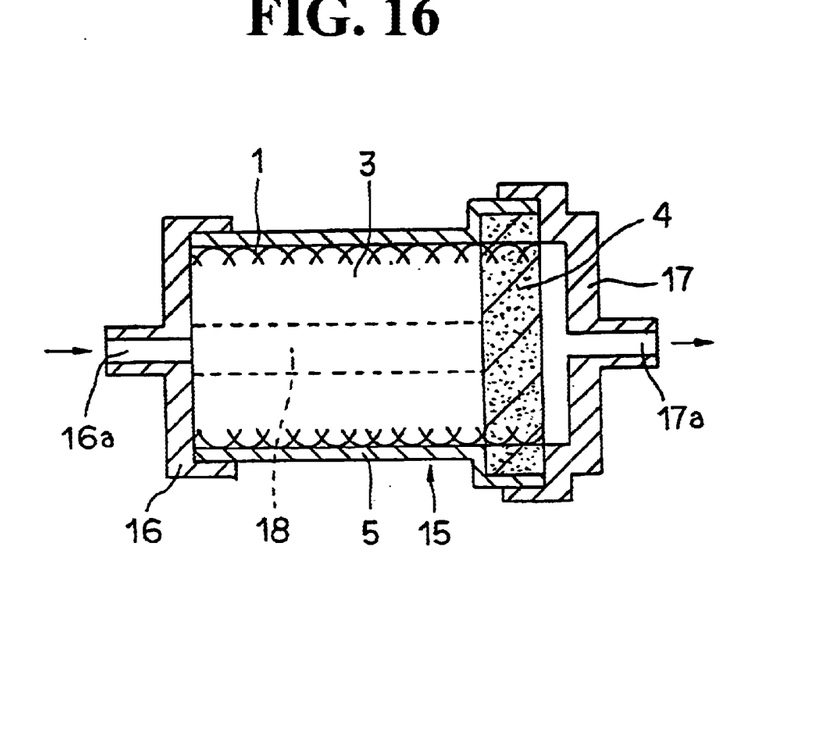
FIG. 16 is a cross section view illustrating an example of the accommodation of the hollow fiber membrane module of this invention.

With reference to FIG. 3, a hollow fiber membrane bundle 3 consisting of a plurality of layers is formed by cheese-winding hollow fiber membranes 1 of thermoplastic resin exhibiting permselectivity to a fluid on a core tube 2 with a proper winding angle, $\theta$, which falls in the range of $0°<\theta<90°$. This hollow fiber membrane bundle 3 confers rigidity upon itself by being cheese-wound in a self-supportably tight state. As illustrated in FIG. 16, this membrane bundle 3 has, in at least one terminal part thereof, a sealed part 4 serving to open the terminal faces of the hollow fiber membranes 1. The hollow fiber membrane bundle 3 has, on the outer periphery thereof, a case 5 which is formed in a tightly sealed state in conjunction with the sealed part 4. This case 5 encloses the outer periphery of the hollow fiber membrane bundle 3 in a state of intimate contact in an effort to preclude the occurrence of a dead space between the case 5 and the outer periphery of the membrane bundle 3 to improve the filtration capacity.

Since the hollow fiber membrane bundle 3 in the cheese-wound state is rigid, it can be manufactured in a fixed shape such that the diameters of the case 5 and the hollow fiber membrane bundle 3 may be adjusted accurately so that the dead space can be eliminated. As a result, when the expensive photoresist fluid to be used in the manufacture of semiconductors is filtered, for example, the amount of the fluid inevitably remaining in the case is decreased. By the same token, the waste of the fluid which occurs during exchange of hollow fiber membrane modules can be prevented to the fullest extent possible.

Figure 17:
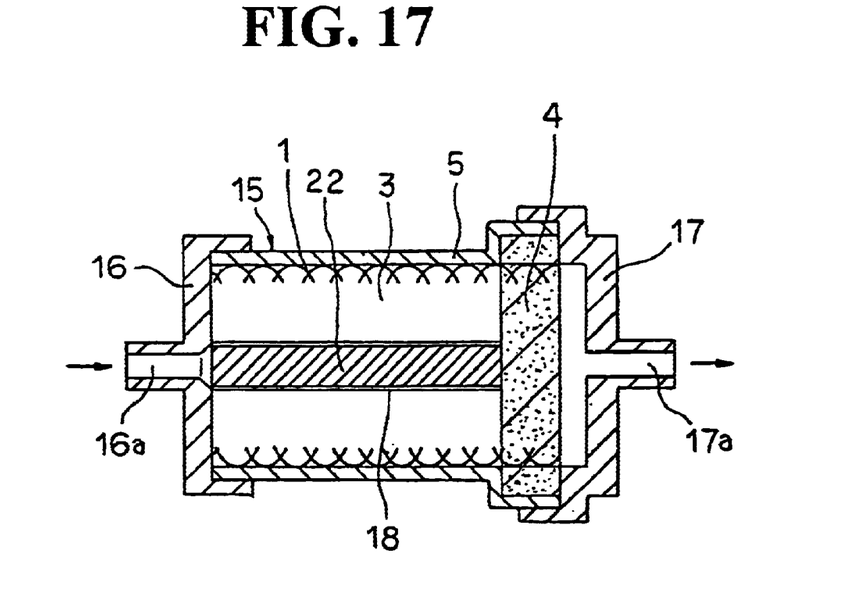
FIG. 17 is a cross section view illustrating another example of the accommodation shown in FIG. 16.
Figure 18:
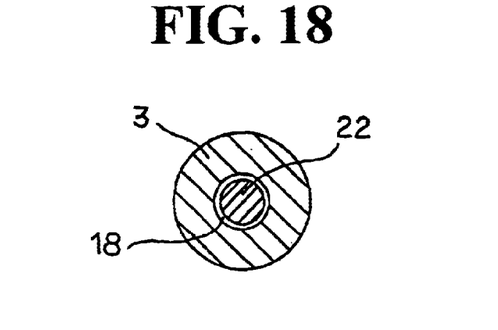
FIG. 18 and FIG. 19 are each cross section views taken through FIG. 17.
Figure 19:
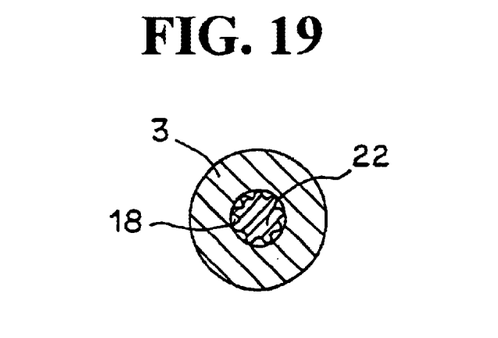

The waste can be further precluded by inserting spacers 22 and 23 in a hollow part 18 which remains after the removal of the core tube 2, as illustrated in FIG. 17, with a view to precluding the occurrence of a dead space.

The hollow fiber membranes 1 are formed of a thermoplastic resin and the sealed part 4 is also formed of a thermoplastic resin. The term "thermoplastic resin" as used herein means polyolefin, such as polyethylene or polypropylene, fluorine resin, polyamide or polyimide, or other species of thermoplastic resin. The hollow fiber membranes 1 are intended for internally or externally refluxing a given fluid by causing the fluid to produce a fluid motion inside or outside the hollow fiber membranes.

Now, the method for production of the hollow fiber membrane module according to this invention will be described specifically below based on FIG. 7 through FIG. 10.

To begin with, the hollow fiber membrane bundle 3 cheese-wound in a plurality of layers is formed, with the rotational speed and the traverse speed of the coil tube controlled, by the use of a cheese-winding device (not shown). This membrane bundle 3 is placed in the case 5 provided in the inner periphery thereof with a stepped part 6 and set in a resin mold 7, and is then mounted on a lowering device 8.

Figure 7:
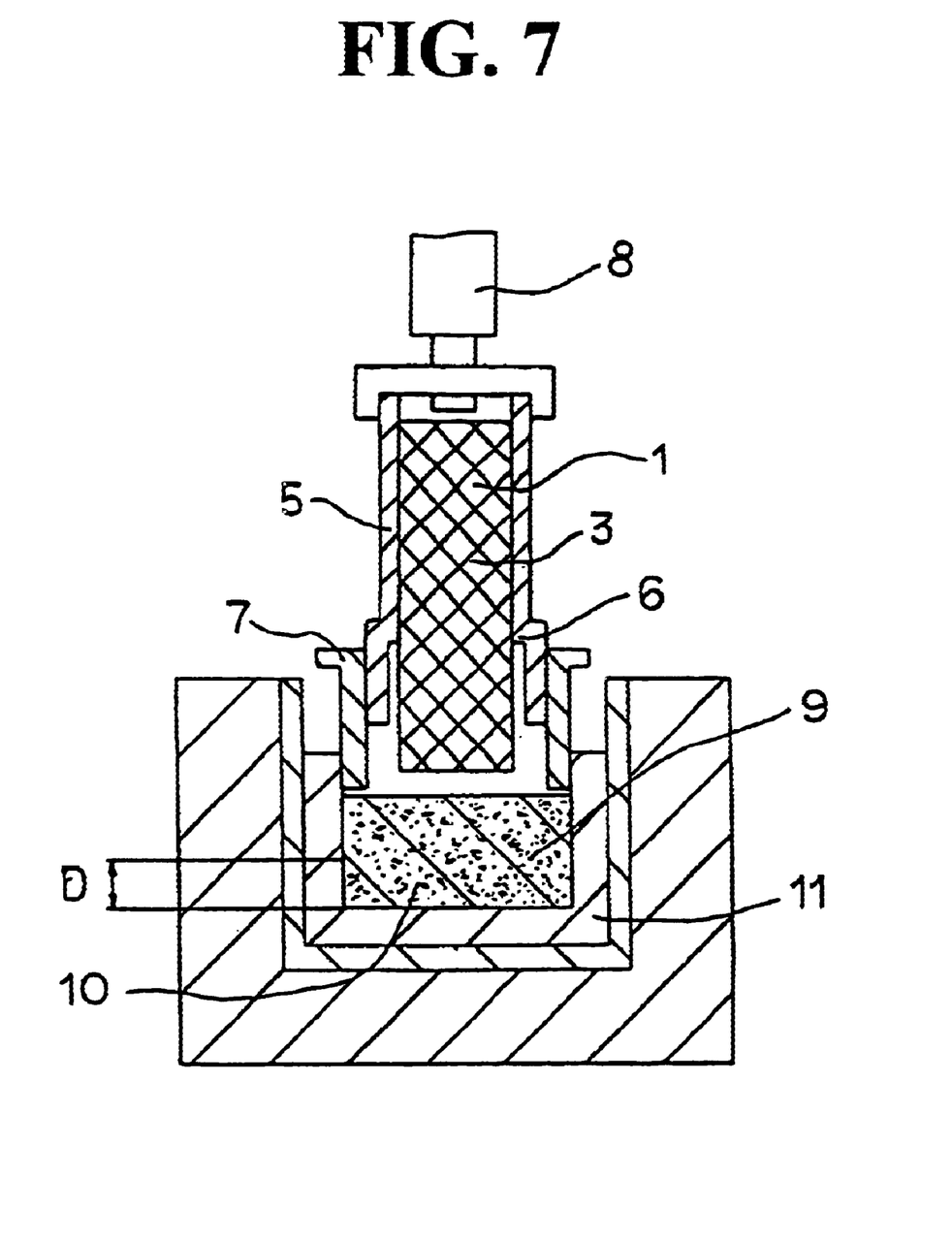
FIG. 7 is an explanatory diagram illustrating a potting step according to this invention.
Figure 8:
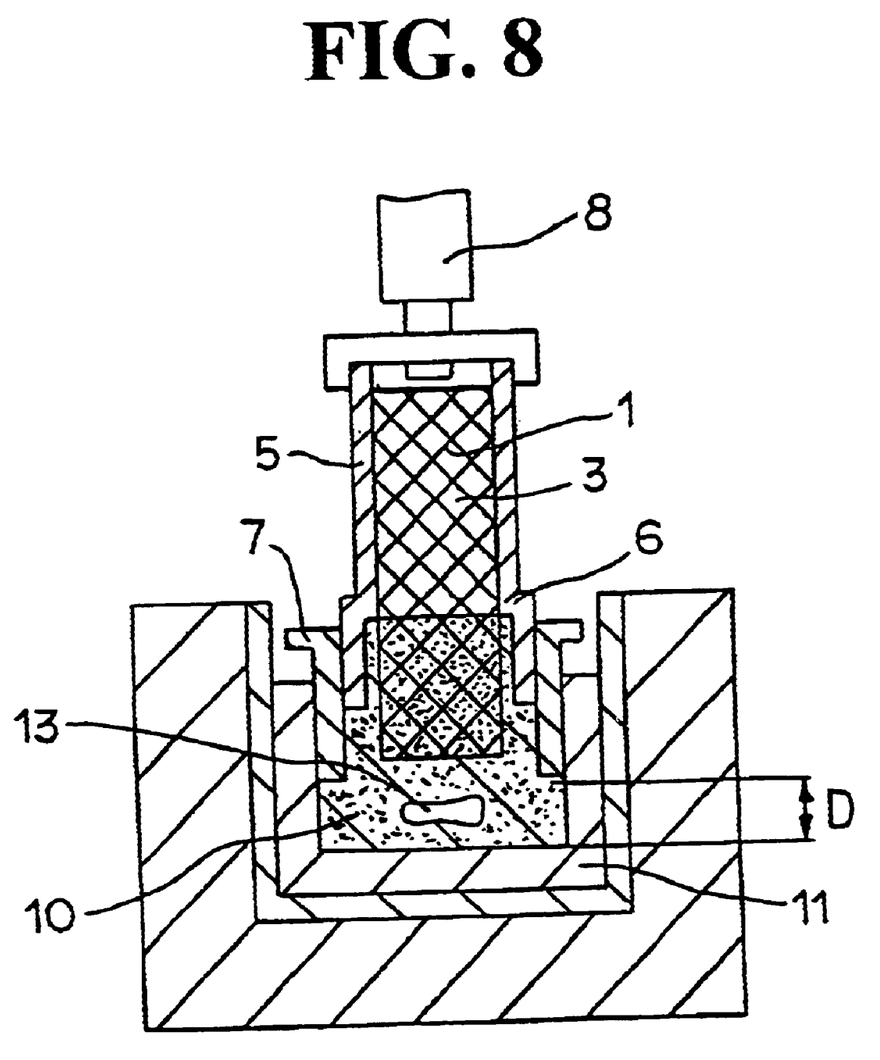
FIG. 8 is an explanatory diagram illustrating a step of immersing the module.
Figure 9:
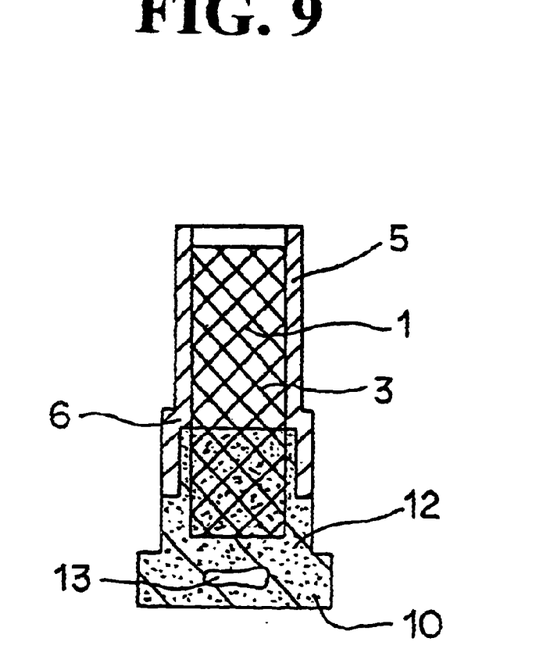
FIG. 9 is an explanatory diagram of a cutting die taken out of a die.
Figure 10:
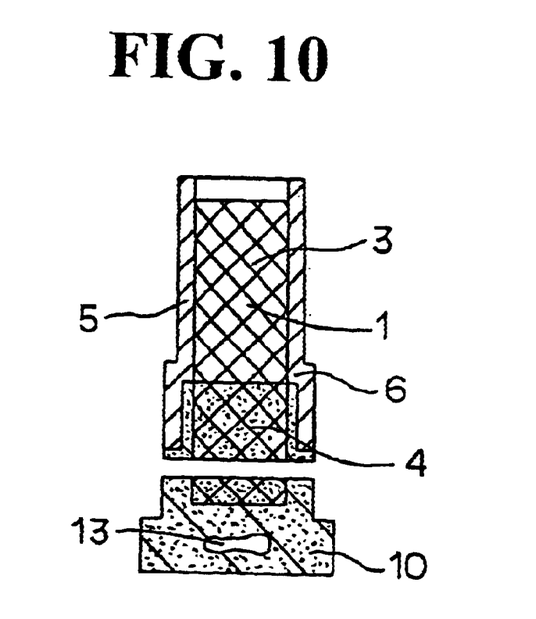
FIG. 10 is an explanatory diagram illustrating the result of cutting a solidified part of a hollow fiber membrane bundle.

Then, thermoplastic resin (polyethylene in this case) pellets are melted. The melt is cooled to and maintained at a prescribed temperature, and the membrane bundle 3 is inserted into a molten resin layer 9 under pressure as illustrated in FIG. 7. In this case, a resin reservoir 10 has a prescribed depth, D, inside a metal die 11. The device 8 shown in FIG. 8 holds the terminal part of the bundle 3 in the melt until it cools to a prescribed temperature and then removes the bundle from the metal die 11. A solidified part 12 is formed at the one terminal part of the membrane bundle 3 and, at the same time, an ingot piping 13 is possibly formed at the site of the resin reservoir 10 as illustrated in FIG. 9. Subsequently, the solidified part 12 is cut as illustrated in FIG. 10 so as to open the terminal ends of the hollow fiber membranes 1 and give rise to the sealed part 4. The solidified part 12 including the resin reservoir 10 is removed to complete manufacture of the hollow fiber membrane module according to this invention.

As a result, the formation of the ingot piping 13 at the potting site of the membrane bundle 3 can be eliminated by removing the resin reservoir 10 which has a prescribed depth D necessary for the formation of the ingot piping 13. By cutting and separating this position, the yield of potting is notably improved and the operational efficiency thereof is increased.

The example, cited above, has offered a description about the immersion potting. It, however, embraces the case of forming the sealed part by first forming the solidified part by injection potting or centrifugal potting and then cutting the solidified part.

Figure 4:
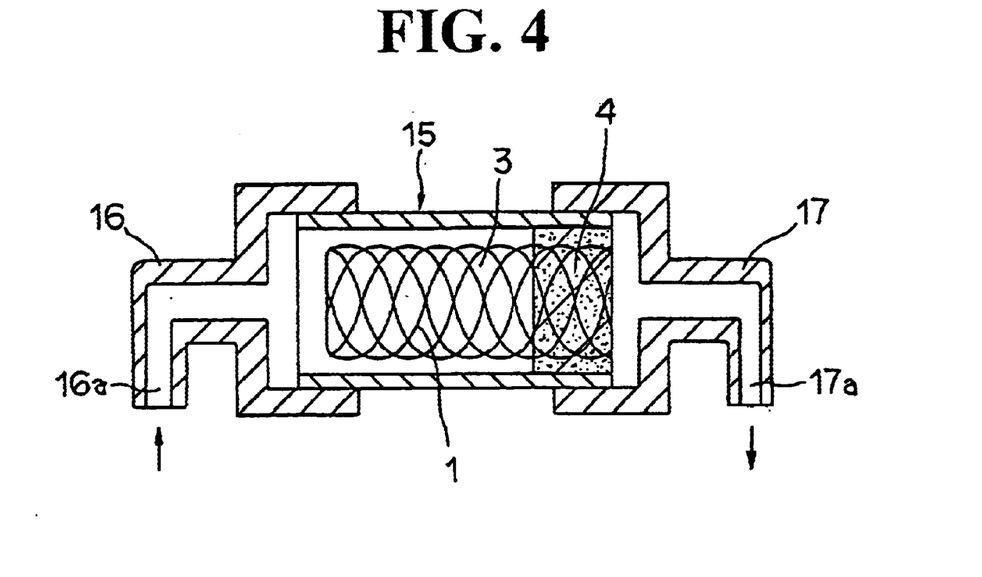
FIG. 4 is a cross section illustrating one example of the accommodation of the hollow fiber membrane module of this invention.

FIG. 4, FIG. 16, and FIG. 17 illustrate varying examples of the hollow fiber membrane module according to this invention. They are filters each provided at the opposite terminal ends of a hollow fiber membrane module 15 with a cap 16 having an inlet 16a and a cap 17 having an outlet 17a.

Figure 5:
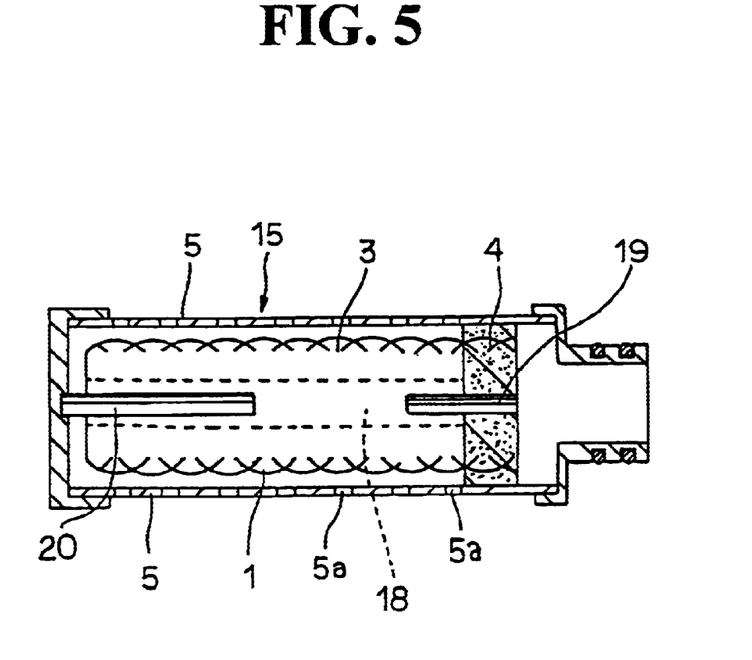
FIG. 5 and FIG. 6 are each cross section views illustrating another example of the accommodation of the hollow fiber membrane module.

FIG. 5 depicts an example of an embodiment of this invention in a 10-inch module. After the core tube 2 has been extracted from the cheese-wound membrane bundle 3, the position occupied by the tube constitutes a hollow part 18. A hydrophobic porous mass 19 is embedded at the sealed part 4 and is utilized as an air vent for allowing the flow of air on the primary side to the secondary side through the medium of the porous mass 19. A retaining part 20 such as a supporting rod or a protuberance is disposed in the hollow part 18 in the other terminal end so as to keep the hollow fiber membrane bundle 3 from producing vibration during the course of transportation or filtration, and to prevent the hollow fiber membranes 1 from being damaged along the boundary between the sealed part 4 and the hollow fiber membranes 1. In the diagram, 5a stands for a communicating hole.

Figure 6:
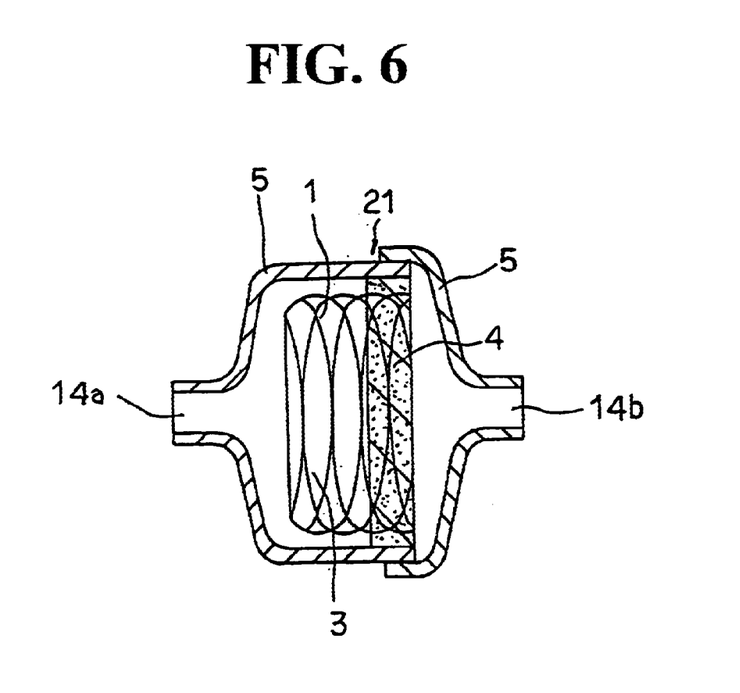

FIG. 6 depicts an example of accommodating a long hollow fiber membrane bundle 3 in a module 21 having an inlet 14a and an outlet 14b, and which is large in diameter and small in length. In most cases (i.e., conventional cases), the ratio, d/L, of the module diameter d to the module length L in the hollow fiber membrane module is not more than 0.6. However, the present invention permits easy manufacture of a module having a larger d/L ratio than 0.6, and provides a module accommodating hollow fiber membranes of great length in spite of a small interfacial dimension. When a hollow fiber membrane bundle 3 according to this invention was manufactured to have an outside diameter of 34 mm with a winding angle of 20° in a module of a fixed visible shape, the module was found to allow accommodation therein of hollow fiber membranes 1 having a length 2.5 times the module length in the outermost ply of the bundle.

Figure 11:
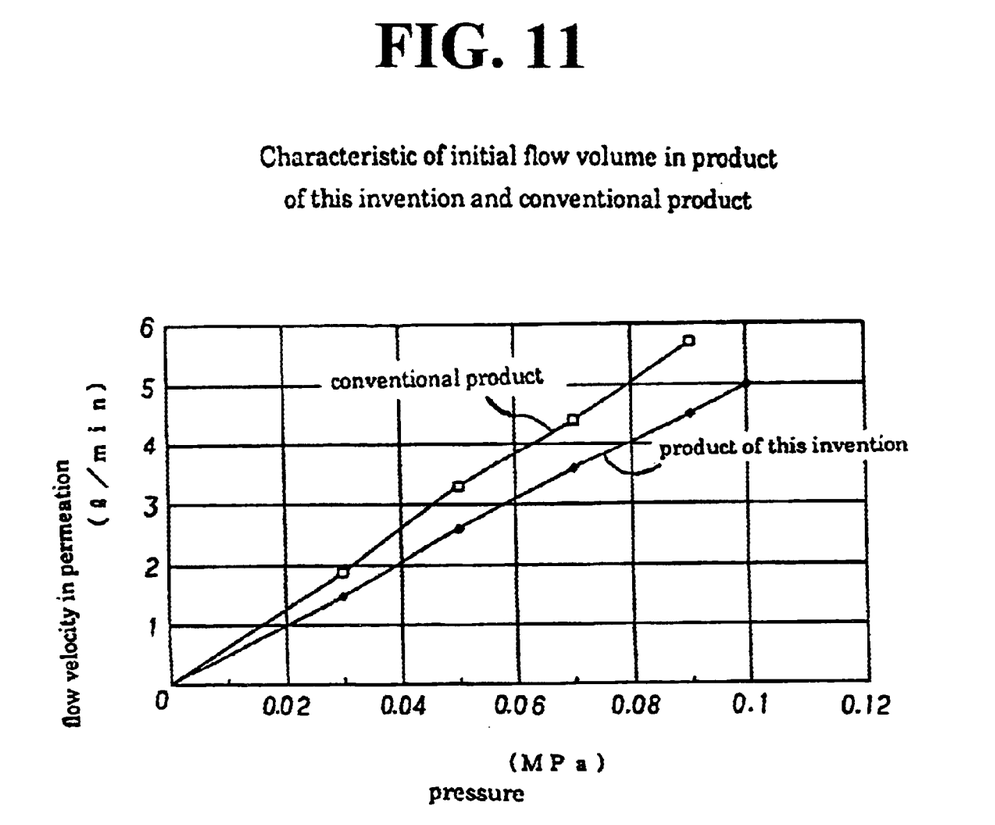
FIG. 11 is a graph for comparing this invention and the conventional product in terms of the characteristic of the initial flow volume.

FIG. 11 shows the results of an initial flow volume test performed on pure water by using the hollow fiber membrane module according to this invention in comparison with those of the conventional product.

The results of the initial flow volume test are also shown in Table 1. It is noted from the test results that the flux per unit membrane area was 15–24% lower in the cheese-wound product of this invention than in the conventional product.

TABLE 1

Comparison of flow velocity of permeation

| | Membrane area (cm$^2$) | Flow volume (ml/min) | Flux (ml/cm$^2$) |
|---|---|---|---|
| Conventional product | 2,450 | 5,900 | 2.68 |
| Product of this invention (cheese-wound with 20°) | 2,602 | 4,800 | 2.05 |
| Product of this invention (cheese-wound with 30°) | 2,333 | 4,800 | 2.29 |

Figure 12:
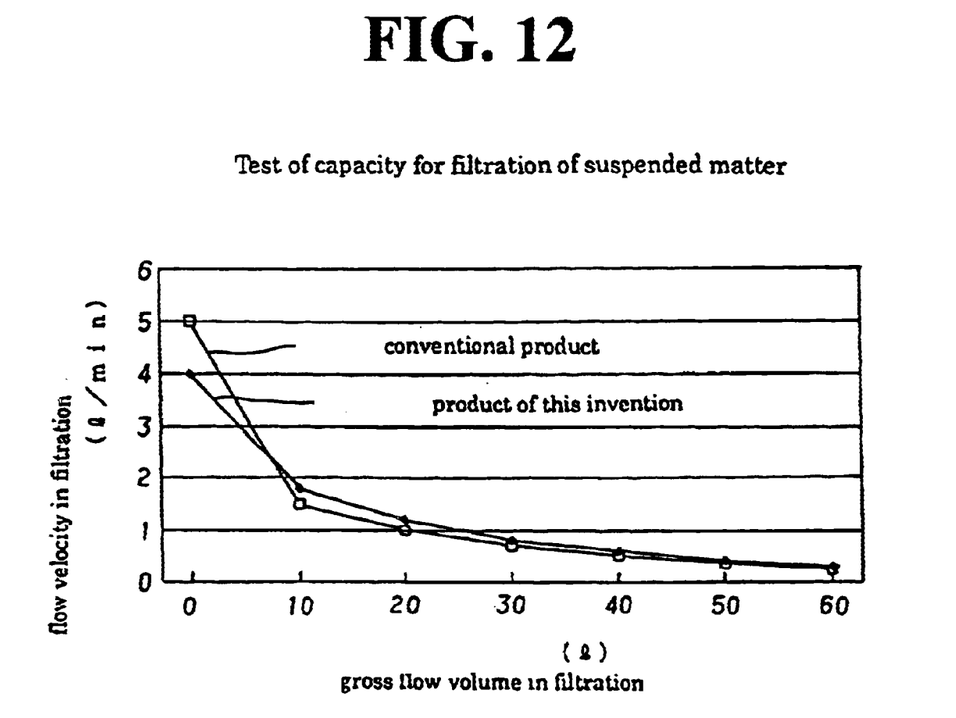
FIG. 12 is a graph for comparing this invention and the conventional product in terms of the behavior of filtration of suspended matter.

FIG. 12 is a diagram showing the results of the comparison made in terms of the capacity for filtering solid fat-free milk as a suspended matter. The data show that the capacity for filtration of suspended matter was equal while the initial flow velocity was slightly different, indicating that the degree of decline of flow volume by clogging was lower.

Figure 13:
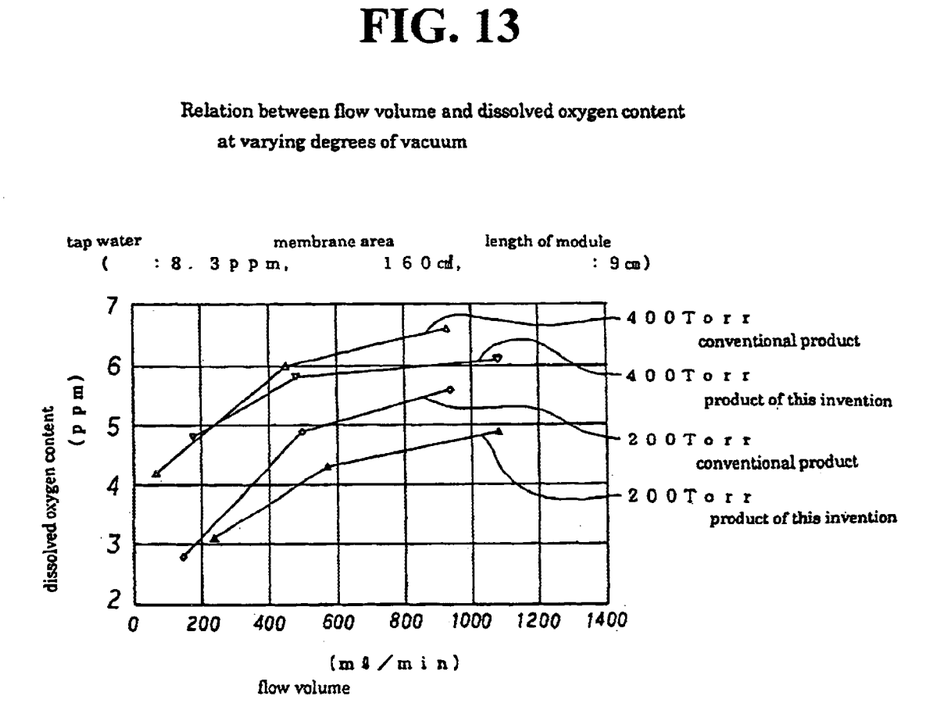
FIG. 13 is a diagram for comparing this invention and the conventional product in a straight form in terms of the relation between the flow volume and the dissolved oxygen content.

FIG. 13 is a graph showing the relationship between the flow volume and the dissolved oxygen content at varying degrees of vacuum. Specifically, this graph shows the results obtained by trially manufacturing a cheese-wound deaeration module according to this invention and a conventional straight deaeration module and testing them for performance in removing dissolved oxygen from tap water. When the relationship between the flow volume and the dissolved oxygen content was investigated at degrees of vacuum of 200 Torr and 400 Torr, the module of this invention was found to have a higher capacity for deaeration under either degree of vacuum. In the comparison using a fixed flow volume of 900 ml/min, the cheese-wound module showed a decrease of about 8–16% in the dissolved oxygen content of the tap water after the deaerating treatment. The test results thus obtained, therefore, demonstrate that the hollow fiber membrane module according to this invention, when adapted for a deaeration module, has a conspicuous effect.

Figure 14:
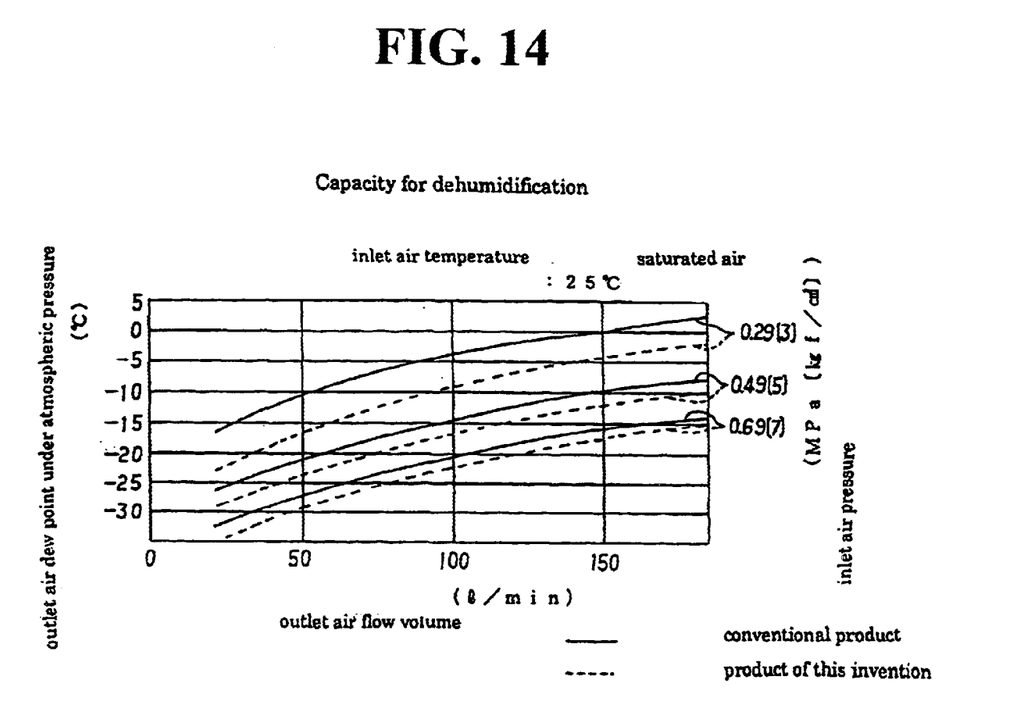
FIG. 14 is a diagram for comparing this invention and the conventional product in terms of the capacity for removal of moisture.

FIG. 14 is a graph comparing the case of using the hollow fiber membrane module according to this invention as a membrane type drier with the case of using the conventional module. The term "membrane type drier" as used herein means a drier having a construction that allows the hollow fiber membrane module of this invention to be built therein, and which is adapted to afford continuous removal of moisture from the air by passing compressed air through hollow fiber membranes 1, discharging steam exclusively outside them, inducing outflow of dry air on the outlet sides of the membranes, and purging part of the dry air on the outlet sides. Thus, the data of FIG. 14 demonstrates that the hollow fiber membrane module of this invention excels in the capacity for dehumidification in the membrane type drier.

Figure 15:
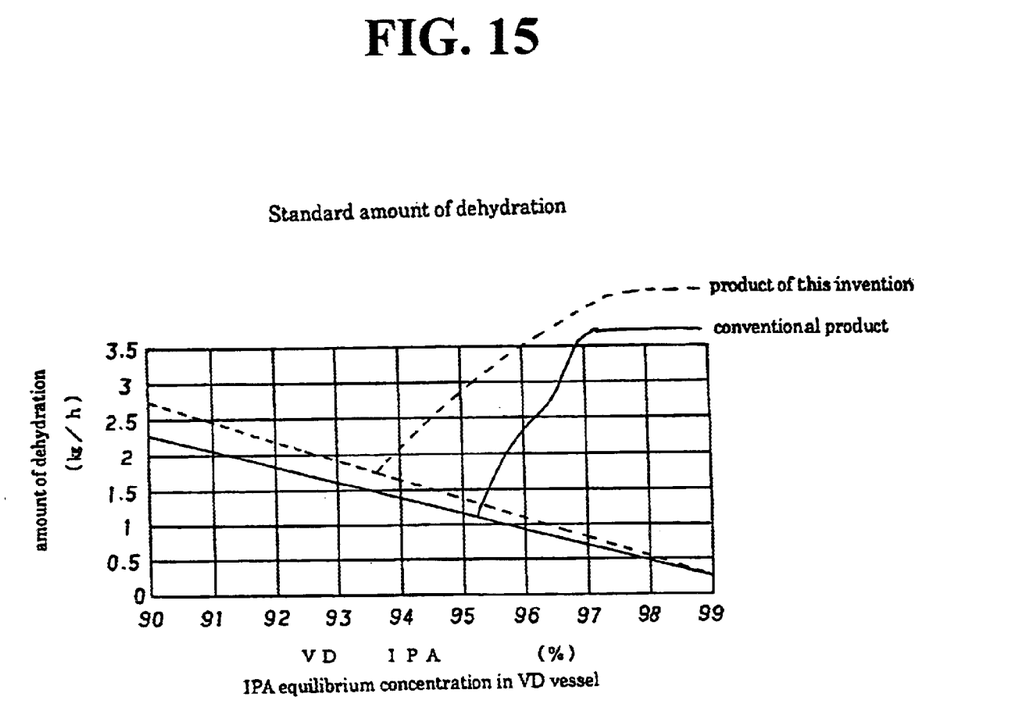
FIG. 15 is a diagram for comparing amounts of dehydration attained by pervaporation.

FIG. 15 is a graph showing the standard amount of dehydration to be attained when the hollow fiber membrane module of this invention is applied to the method of pervaporation adopted for hydrous IPA. The data of this graph demonstrate that the product of this invention exhibits an excellent dehydrating ability as compared with the conventional product.

The hollow fiber membrane module according to this invention, as described above, particularly excels in the ability to effect filtration by virtue of material transfer. The effect of this hollow fiber membrane module according to this invention is conspicuous.

Figure 20:
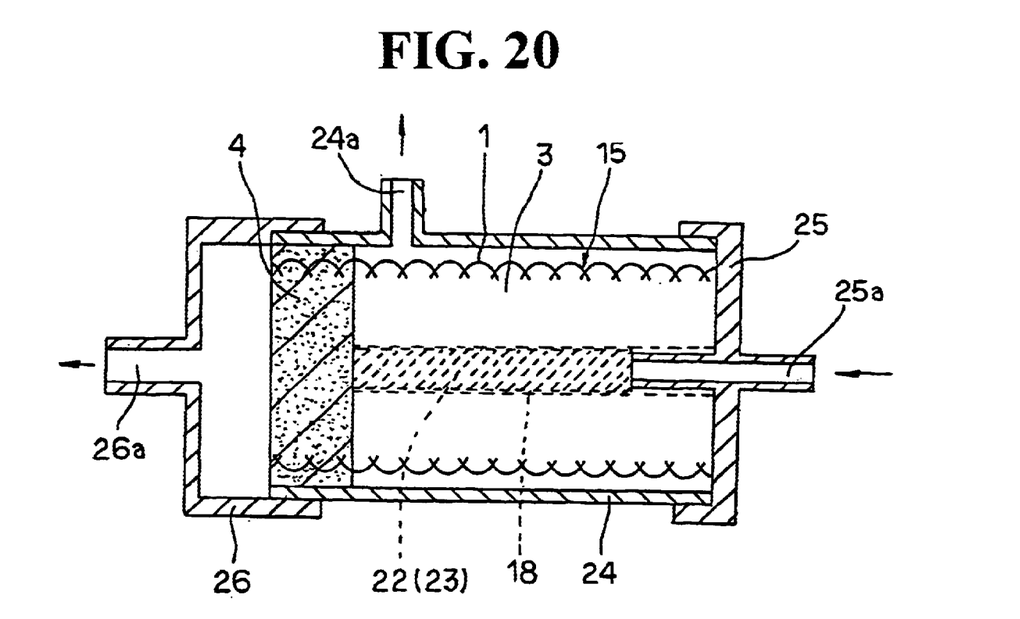
FIG. 20 is a cross section view illustrating an example of a deaeration module according to this invention.

FIG. 20 is a cross section illustrating an example of applying the hollow fiber membrane module according to this invention to an external reflux type deaeration module. This deaeration module is composed of an outflow mouth 24a formed in a case 24 for the hollow fiber membrane module 15, a cap 25 having an inflow mouth 25a, and a cap 26 having a discharge mouth 26a. In this case, the fluid under treatment which has passed into the hollow part 18 via the inflow mouth 25a is deaerated by the hollow fiber membranes 1 of the membrane bundle 3. The gas then discharges through the discharge mouth 26a, and the deaerated fluid flows out of the outflow mouth 24a. As another example of this application, the deaeration of the fluid may be attained by reversing the direction of the flow of the fluid, using the member 24a as an inflow mouth and the member 25a as an outflow mouth, and discharging the gas through the discharge mouth 26a.

Therefore, a module having long hollow fiber membranes can easily be fabricated in a predetermined interfacial dimension. For this reason, the hollow fiber membrane module according to the present invention can be used advantageously for a deaeration module, a membrane type drier, pervaporation, or a bioreactor.

We claim:

1. A hollow fiber membrane module comprising:

a hollow fiber membrane bundle including a plurality of layers of cheese-wound permselective hollow fiber membranes, each of said hollow fiber membranes being formed of thermoplastic resin and having rigidity;

a sealed part formed of thermoplastic resin in at least one terminal part of said hollow fiber membrane bundle;

a module casing enclosing said hollow fiber membrane bundle, said module casing having an inflow port at a first end, a discharge port at a second end opposite said first end, and an outflow port between said inflow port and said discharge port;

a hydrophobic porous mass embedded in a first end of said hollow fiber membrane bundle so as to extend in a longitudinal direction of said hollow fiber membrane bundle; and a retaining part embedded in a second end of said hollow fiber membrane bundle opposite said first end so as to extend in a longitudinal direction of said hollow fiber membrane bundle;

wherein said hollow fiber membrane module has a module diameter d and a module length L, said hollow fiber membrane module having a ratio d/L greater than 0.6, said hollow fiber membrane module comprising one of a deaeration module, a drier module, a pervaporation module, a bioreactor module, a gas separation module, an artificial dialysis module, and an artificial lung module.

2. The hollow fiber membrane module of claim 1, wherein adjoining hollow fiber membranes are superposed in a plurality of layers and cheese-wound on a core tube so as to have a prescribed winding angle and so as to form a self-supporting, tight hollow fiber membrane bundle.

3. The hollow fiber membrane module of claim 1, wherein said hollow fiber membrane bundle includes a spacer inserted into said hollow fiber membrane bundle along a central longitudinal axis of said hollow fiber membrane bundle so as to be surrounded by said hollow fiber membranes.

4. The hollow fiber membrane module of claim 1, wherein said thermoplastic resin comprises one of a polyolefin, fluorine resin, polyamide, and polyimide, wherein said polyolefin includes polyethylene and polypropylene.

5. The hollow fiber membrane module of claim 1, further comprising a module casing enclosing said hollow fiber membrane bundle, said module casing having a plurality of communicating holes formed therethrough.

6. A hollow fiber membrane module comprising:

a module casing having an inflow port at a first end, a discharge port at a second end opposite said first end, and an outflow port between said inflow port and said discharge port;

a hollow fiber membrane bundle arranged in said module casing such that said module casing tightly encloses an outer periphery of said hollow fiber membrane bundle, said hollow fiber membrane bundle including a plurality of layers of cheese-wound permselective hollow fiber membranes, each of said hollow fiber membranes being formed of thermoplastic resin and having rigidity;

a sealed part formed of thermoplastic resin in at least one terminal part of said hollow fiber membrane bundle so as to form a seal between said hollow fiber membrane bundle and said module casing;

a hydrophobic porous mass embedded in a first end of said hollow fiber membrane bundle so as to extend in a longitudinal direction of said hollow fiber membrane bundle; and a retaining part embedded in a second end of said hollow fiber membrane bundle opposite said first end so as to extend in a longitudinal direction of said hollow fiber membrane bundle;

wherein said hollow fiber membrane module has a module diameter d and a module length L, said hollow fiber membrane module having a ratio d/L greater than 0.6, said hollow fiber membrane module comprising one of a deaeration module, a drier module, a pervaporation module, a bioreactor module, a gas separation module, an artificial dialysis module, and an artificial lung module.

7. The hollow fiber membrane module of claim 6, wherein adjoining hollow fiber membranes are superposed in a plurality of layers and cheese-wound on a core tube so as to have a prescribed winding angle and so as to form a self-supporting, tight hollow fiber membrane bundle.

8. The hollow fiber membrane module of claim 6, wherein said hollow fiber membrane bundle includes a spacer inserted into said hollow fiber membrane bundle along a central longitudinal axis of said hollow fiber membrane bundle so as to be surrounded by said hollow fiber membranes.

9. The hollow fiber membrane module of claim 6, wherein said thermoplastic resin comprises one of a polyolefin, fluorine resin, polyamide, and polyimide, wherein said polyolefin includes polyethylene and polypropylene.

10. The hollow fiber membrane module of claim 6, wherein said module casing has a plurality of communicating holes formed therethrough.

* * * * *